US005759672A

United States Patent [19]

Fujii et al.

[11] Patent Number: 5,759,672

[45] Date of Patent: Jun. 2, 1998

[54] TRANSFER SHEET FOR ELECTROPHOTOGRAPHY

[75] Inventors: Hiroyuki Fujii, Honmachi; Akira Nakamura, Tokyo, both of Japan

[73] Assignee: Oji Paper Co., Ltd., Tokyo, Japan

[21] Appl. No.: 732,727

[22] Filed: Oct. 18, 1996

[30] Foreign Application Priority Data

Oct. 20, 1995 [JP] Japan .................................. 7-272200

[51] Int. Cl.$^{6}$ .................................................. B23B 3/00

[52] U.S. Cl. ...................... 428/195; 428/218; 428/304.4; 428/307.3; 428/308.4; 428/314.4; 427/210; 427/256; 427/331; 427/372.2

[58] Field of Search .................................. 428/195, 201, 428/913, 914, 613, 103, 156, 306.6, 218, 304.4, 307.3, 308.4, 314.4; 427/212, 210, 256, 331, 372.2

[56] References Cited

U.S. PATENT DOCUMENTS 4,778,711 10/1988 Hosomura et al. .

FOREIGN PATENT DOCUMENTS 0 400 681 12/1990 European Pat. Off. .
0 621 510 10/1994 European Pat. Off. .
0 663 300 7/1995 European Pat. Off. .

OTHER PUBLICATIONS

Patent Abstracts of Japan, vol. 014, No. 046, Jan. 26, 1990, JP-A-01 275184, Nov. 2, 1989.

*Primary Examiner*—William Krynski
*Attorney, Agent, or Firm*—Oblon, Spivak, McClelland, Maier & Neustadt, P.C.

[57] ABSTRACT

A transfer sheet for electrophotography is disclosed. The transfer sheet comprises a sheet substrate and a porous resin-containing coated layer formed on at least one surface of the substrate. The coated layer has a surface average pore diameter of 0.5 to 50 μm, having a surface pore opening area ratio of at 10 to 70%, and having a density of 0.1 to 0.8 g/cm$^3$. The transfer sheet eliminates disturbance of mottles and dots in the image portion and provides a high quality picture image small in gloss contrast between the blank portion and the image portion.

17 Claims, No Drawings

TRANSFER SHEET FOR ELECTROPHOTOGRAPHY

BACKGROUND OF THE INVENTION

1. Field of the Invention

The present invention relates to a transfer sheet for electrophotography, particularly, to a transfer sheet for electrophotography which causes no mottles in the recorded image portion and provides an image with a high quality small in gloss contrast between the blank portion and the image portion, when used in a full color type or monochromatic copying apparatus of indirect dry-type electrophotography or in a printer.

2. Description of the Related Art

Intensive studies have been made in an attempt to improve the quality of the recorded picture image in electrophotography in accordance with recent trends toward the coloring and digital mode operation of the electrophotographic copying apparatus or printer. Particularly, in a full color copying apparatus and printer of electrophotographic system, a digital processing for input/output of a picture image is widely employed nowadays in order to obtain a high quality picture image. Along this line, marked improvements have been made in the picture image input method, processing method of the input picture image, developing method, transfer method, fixing method, etc. Marked improvements have been also made in the image forming materials including the developing agents and the photosensitive agents in accordance with advent of digital recording of high precision and color recording of a high color density.

However, when the conventional transfer sheets for electrophotography are used in the full color copying apparatus or printer of the improved electrophotographic system described above, there are problems, for example, in that the clarity of picture image is impaired by the disturbance of mottles and dots in the region ranging from the half tone portion to the high density picture image portion included in the solid picture image and in that the gloss feel in the high density picture image portion is rendered excessive and in that, accordingly, the difference in gloss between the high density picture image portion and the half tone portion or blank portion is rendered prominent. As a result, the entire picture image gives a highly unnatural impression.

Methods for suppressing the generation of picture image defects such as blister in the recording by coated type transfer sheet when used in indirect dry type electrophotography have been proposed in, for example, Japanese Patent Disclosure (hereinafter referred to as "JP Kokai") Nos. 62-198877 and 3-294600, which methods comprising keeping the air permeability of a smooth coated paper sheet at a certain level or lower, or adding a non-film forming resin to the transfer sheet, so as to improve the recorded picture image quality and eliminate the picture image defects. It has been also proposed in JP Kokai No. 62-198877 that unsatisfactory image transfer under high humidity can be improved by maintaining the surface electrical resistance at a certain level or higher under high humidity. Further, it has been also proposed in JP Kokai No. 3-242654 that unsatisfactory image transfer under high humidity can be improved by using a special emulsion type adhesive. However, these prior art techniques are insufficient in improvements of the defects such as the mottle generation in the picture image portion and the unnatural gloss in the high density picture image portion.

In recent years, demands for high image quality have become much severer in, for example, the full color copying apparatus. In particular, severer demands are being directed to improvements of defects such as the mottle generation in the region ranging from the half tone portion to the high density picture image portion and the gloss contrast between the blank portion and the picture image portion.

SUMMARY OF THE INVENTION

An object of the present invention is to provide a transfer sheet used for picture image recording in a full color type or monochromatic copying apparatus and a printer of indirect dry type electrophotographic system, which eliminates disturbance of mottles and dots in the recorded image portion and also obtains a high quality picture image small in gloss contrast between the blank portion and the image portion.

According to the present invention, there is provided a transfer sheet used for picture image recording in electrophotography, comprising a sheet substrate and a porous resin-containing coated layer formed on at least one surface of said sheet substrate, wherein the average diameter of the pores on the surface (hereinafter referred to as "surface average diameter") of the coated layer falls within a range of between 0.5 and 50 μm, wherein the pore opening area ratio on the surface (hereinafter referred to as "surface pore opening area ratio") of the coated layer is at least 10%, and wherein the density of the coated layer falls within a range of between 0.1 and 0.8 g/cm$^3$.

In the transfer sheet for electrophotography of the present invention, it is desirable for the coated layer to have a large number of fine pores and to be formed by stirring a resin-containing liquid so that the liquid contains fine foams dispersed therein, coating at least one surface of a sheet substrate with the resultant liquid, and drying the coating. It is also desirable for the coated layer in the transfer sheet of the present invention to exhibit a surface electrical resistance falling within a range of between $1.0\times10^8\Omega$ and $1.0\times10^{11}\Omega$ at 20° C. and a relative humidity (RH) of 65%.

DESCRIPTION OF PREFERRED EMBODIMENT

As a result of an extensive research made in an attempt to achieve the object described above, the present inventors have found that it is possible to solve the above-noted problems by forming a porous resin-containing coated layer on the surface of a sheet substrate and by controlling appropriately the surface average pore diameter and the surface pore area ratio as well as the density of the coated layer. The present invention has been completed based on this finding.

To be more specific, the present invention provides a transfer sheet used for picture image recording in a full color type or monochromatic copying apparatus of indirect dry-type electrophotographic system and in a printer. The transfer sheet of the present invention comprises a sheet substrate and a porous resin-containing coated layer formed on at least one surface of the sheet substrate. In forming the coated layer, at least one surface of the sheet substrate is coated with a resin-containing liquid, which is previously mechanically stirred to form a large number of fine foams, followed by drying the coating, so as to produce the resultant coated layer having a large number of fine pores dispersed therein, wherein the coated layer has fine pores on the surface with a surface average pore diameter of 0.5 to 50 μm, a surface pore opening area ratio of at least 10%, and a density of 0.1 to 0.8 g/cm$^3$. The transfer sheet of the present invention makes it possible to obtain a recorded picture image of a high quality in that the disturbance of the mottles and dots is suppressed in the recorded picture image portion and that the gloss contrast between the blank portion and the picture image portion is reduced, as compared with the conventional transfer sheet used for a picture image recording in electrophotography.

In the conventional transfer sheet, the toner expands in a horizontal direction on the surface of the coated layer in the melting and fixing step and scarcely permeates into the coated layer. As a result, the adjacent molten toners are partially joined so as to impair the clarity in the region ranging from the half tone portion to the high density picture image portion. If a large gloss contrast is provided between the blank portion and the picture image portion, the picture image portion is felt floating relative to the blank portion, leading to impression of an unnatural picture image, which is generally undesirable. In the present invention, however, the porous resin-containing coated layer is formed on the surface of the sheet substrate, making it possible for the toner to permeate sufficiently into the inner region of the transfer sheet. It follows that it is possible to suppress the unnatural gloss in the recorded image portion.

The present invention will be explained in more detail below.

The porous resin-containing coated layer of the present invention contains resin as a main component. A pigment may also be contained in the layer. The coated layer may be formed by mechanically stirring a resin-containing liquid so as to form many fine foams dispersed therein, and then coating a substrate with the resultant liquid, followed by drying the coating. In this way, the resultant coated layer contains a large number of fine foams, leading to a porous structure.

Resins soluble or dispersible in water are used for forming the coated layer of the present transfer sheet. The resins usable in the present invention include, for example, polyvinyl alcohols of various molecular weights and saponification values as well as derivatives thereof; starch and derivatives thereof including, for example, various processed starches such as oxidized starch; cellulose derivatives such as methoxy cellulose, carboxymethyl cellulose, methyl cellulose and ethyl cellulose; polysodium acrylate, polyvinyl pyrrolidone, acrylamid-acrylic ester copolymer, acrylamide-acrylic ester-methacrylic ester copolymer, and alkali salts of styrene-maleic anhydride copolymer; water soluble resins such as polyacrylamide, derivatives thereof and polyethylene glycol; and water dispersible resins such as latexes of, for example, polyvinyl acetate, polyurethane, styrene-butadiene copolymer, nitrile-butadiene copolymer, polyacrylic ester, vinyl chloride-vinyl acetate copolymer, polybutyl methacrylate, ethylene-vinyl acetate copolymer, styrene-butadiene-acrylic compound copolymer, and polyvinylidene chloride. In addition, it is possible to use glue, casein, soybean protein, gelatin, sodium alginate, etc. for forming the porous coated layer of the transfer sheet of the present invention. Of course, the water soluble resins and water dispersible resins used in the present invention are not limited to those exemplified above. Further, these resins can be used singly or as a mixture of a plurality of these resins.

The pigment usable in the present invention includes, for example, inorganic pigments such as zinc oxide, titanium oxide, calcium carbonate, silicic acid, silicate, clay, talc, mica, calcined clay, aluminum hydroxide, barium sulfate, lithopone, silica, and colloidal silica; and organic pigments which are called plastic pigments processed into various shapes such as spheres and hollow bodies of, for example, polystyrene, polyethylene, polypropylene, epoxy resin, and styrene-acrylic compound copolymer. The pigments also include starch powder, cellulose powder, etc. The pigments used in the present invention are not limited to those exemplified above. Further, these pigments can be used singly or as a mixture of a plurality of pigments.

In order to improve the quality of the electrophotographically transferred picture image, it is desirable that the amount of the pigment, if used, should fall within a range of 0 to 900 parts by weight, much preferably 0 to 100 parts by weight, relative to 100 parts by weight of the solid content of the resin-containing liquid. When the pigment amount exceeds the upper limit of the range noted above, the coated layer cannot provide a sufficient mechanical strength. As a result, the coated layer tends to peel off from the substrate in the picture image forming step, leading to degradation of the picture image quality.

It is possible to add, as required, known additives to the resin-containing liquid before the foaming step. These additives include, for example, a foam stabilizer, a surfactant acting as a foaming agent, a viscosity controller (or a so-called thickener), a dispersing agent, a dying agent (dye), a water-proof agent, a lubricant, a crosslinking agent, a plasticizer, and an electrically conductive agent.

The amount of the resin-containing liquid to be coated on a sheet substrate is preferably 2 to 40 grams (dry basis), much preferably 3 to 20 grams, per 1 $m^2$ of the substrate. When the coating amount is smaller than 2 $g/m^2$, it is apt to be difficult to make up sufficiently for the surface roughness of the substrate, leading to a rough feel of the picture image recorded on the transfer sheet. On the other hand, when the coating amount exceeds 40 $g/^2$, the coated layer is rendered unduly too thick, with the result that the coated layer is likely to peel off from the substrate or is likely to receive damage. Accordingly, it is important to pay careful attention to the coating amount of the resin-containing liquid and the composition of the resin-containing liquid.

In forming the coated layer, a resin-containing liquid is mechanically stirred to form a large number of foams dispersed within the liquid, the resultant liquid is coated on a sheet substrate, and then the coating is dried. The method and equipment for forming the foams in the liquid are not particularly limited in the present invention. The coating method is not also strictly limited in the present invention. However, it is desirable that the volume ratio of the foam-containing liquid to the original liquid (hereinafter referred to as "foaming magnification") should be: $1<\text{foaming magnification}\leqq 10$, preferably $1<\text{foaming magnification}\leqq 5$. The foaming magnification is a measure for denoting the foam content of the foam-containing liquid. In other words, the higher the foaming magnification, the thinner the resin membrane (wall) consisting the foam. In this way, when resin membrane becomes thinner, it becomes more difficult to maintain a sufficiently high mechanical strength of the coated layer. Accordingly, it is important to pay careful attention to the balance between the foaming magnification and the composition of the resin-containing liquid.

The transfer sheet of the present invention makes it possible to obtain a high quality picture image recorded thereon, provides no mottles in the recorded picture image portion, and suppresses the gloss contrast between the blank portion and the picture image portion. The reason why this prominent effect can be obtained by the present invention is considered to be related to the physical properties such as the structural characteristics and surface smoothness of the coated layer. In terms of the structural characteristics, it is considered reasonable to understand that, since a large number of fine pores are present on the surface of the transfer sheet, the molten toner permeates sufficiently into the inner region of the coated layer in the step of fixing the picture image and accordingly, the gloss can be reduced in the region ranging from the half tone portion to the high density picture image portion.

In this respect, the size of the pores on the surface of the coated layer is important. To be more specific, it is important for the surface average diameter of the pores of the coated layer to fall within a range of between 0.5 μm and 50 μm in order to form a good picture image on the transfer sheet of the present invention in the toner transferring step. Preferably, the surface average pore diameter should fall within a range of between 1 μm and 20 μm. When the surface average pore diameter is smaller than 0.5 μm, the molten toner fails to permeate sufficiently into the inner region of the coated layer, which leads to failure to suppress sufficiently the gloss in the region ranging from the half tone portion to the high density picture image portion. On the other hand, when the surface average pore diameter exceeds 50 μm, the picture image recorded on the transfer sheet tends to be roughened. Incidentally, the diameters of the pores on the surface of the coated layer can be measured by using a photomicrograph, or by using both a scanning electron micrograph and a picture image analyzing apparatus.

The pore size is affected by various conditions including, for example, the composition of the resin-containing liquid before the foam formation/dispersion treatment, the kinds of the materials used in the liquid, mixing ratio of the materials, amount or concentration of the solid content of the liquid, i.e., the amount of the solid components remaining in the coated layer after the steps of the foam formation, coating and drying, which are directly relevant to the thickness of the resultant coated layer. Accordingly, it is necessary to set suitable conditions. Further, the foam size of the pores on the surface of the coated layer is related to the size of the foams in the foam-containing liquid. In general, the smaller the size of the foams in the resin-containing liquid is, the smaller the pore size of the pores on the surface of the coated layer is. Accordingly, the average foam size is preferably 0.5 to 50 μm, which is equivalent to the size of the pores on the surface of the coated layer, although the state of the foams in the resin-containing liquid is not particularly limited in the present invention. The size of the foams contained in the resin-containing liquid can be measured by photographing a part of the foams, followed by measuring the foam size with an image analyzer.

In the present invention, it is necessary for the surface pore opening area ratio of the coated layer to be 10 to 70%. The permeation of the molten toner into the inner region of the coated layer is improved with increase in the pore opening area ratio. Accordingly, the glossy feel in the picture image portion of the recorded transfer sheet can be sufficiently reduced. When the surface pore opening area ratio is less than 10%, the molten toner fails to permeate sufficiently into the inner region of the coated layer, resulting in failure to suppress sufficiently the glossy feel in the picture image portion of the recorded transfer sheet. On the other hand, when the surface pore opening area ratio is larger than 70%, the permeation of the molten toner into the inner side of the coated layer is too excessive, and accordingly, the record density on the surface becomes insufficient. Preferably, the surface pore opening area ratio falls within a range of between 15% and 50%. When the surface pore opening are a ratio falls within the preferred range noted above, it is possible to maintain a sufficiently high mechanical strength of the coated layer. Incidentally, the term "surface pore opening area ratio" used herein represents a ratio of the total area of the open portions occupied by the pores on the surface of the coated layer to the entire surface area of the coated layer.

Another structural feature of the present invention is that, when a cross-section of the coated layer is observed with a scanning electron micrograph or the like, a large number of pores open in the resin-containing layer surrounding the pores and communicate with adjacent pores (that is, they form continuous pores). Due to this particular inner structure of the coated layer, the transferred toner can be melted and permeate into the pores on the surface and, then, are caught in the inner region of the coated layer, in the picture image fixing step. As a result, the transfer sheet of the present invention exhibits a high ink receiving capability.

Further, the density of the coated layer of the present invention falls within a range of between 0.1 and 0.8 $g/cm^3$, preferably within a range of between 0.2 and 0.7 $g/cm^3$. The coated layer having a density lower than 0.1 $g/cm^3$ fails to exhibit a sufficiently high mechanical strength. On the other hand, when the density of coated layer exceeds 0.8 $g/cm^3$, the volume of the pores within the coated layer is insufficient, so that the molten toner fails to permeate sufficiently into the coated layer, and, accordingly, it is difficult to obtain a desired effect sufficiently.

It is desirable that the coated layer generally exhibits a surface electrical resistance falling within a range between $1\times10^8$ and $1\times10^{12}\Omega$, preferably between $1\times10^8$ and $1\times10^{11}\Omega$, much preferably between $1\times10^9\Omega$ and $1\times10^{11}\Omega$. When the surface electrical resistance is lower than $1\times10^8\Omega$, it is more difficult to achieve a sufficient toner transfer onto the transfer sheet of the present invention under an environment of a high humidity, leading to disturbance of the dots and to an uneven toner density. On the other hand, when the surface electrical resistance is higher than $1\times10^{12}\Omega$, the toner is likely to be scattered when the transfer sheet having the toner transferred thereon is peeled off from a photosensitive body under an environment of a low humidity, giving rise to disturbance of dots. As a result, the printed picture image quality is likely to be lowered.

The method for dispersing foams in a resin-containing liquid (hereinafter referred to as "foaming method") is not particularly limited in the present invention. However, the devices used for the foaming method includes a foaming machine used in the manufacture of confectionery, which has stirring vanes rotating about their own axes while making orbital motions, a homogenizing mixer generally used in emulsification and dispersion, a stirrer such as a Cowless dissolver, and an apparatus in which a mixture of air and a resin-containing liquid is continuously introduced into a closed system for mechanical stirring of the mixture within the closed system so as to divide the air into fine foams and to disperse the fine foams within the resin-containing liquid, such as continuous foaming machines developed by Gaston County Inc. in the United States and Stork Inc. in the Netherlands.

Additives may be added, if necessary, which are called a foam stabilizer or foaming agent and selected from among various materials exhibiting the function of a surface active agent in order to improve the stability of the foams within the foam-containing liquid. These additives can also be used in the case where it is difficult to obtain a desired foam-containing state because the facilities for the mechanical stirring are insufficient.

It is desirable to use, as the foam stabilizer or foaming agent, a higher fatty acid, a denatured higher fatty acid, alkali salts of a higher fatty acid, etc. because these materials are particularly effective for improving the foamability of the resin-containing liquid or for improving the stability of the foams dispersed in the resin-containing liquid. The selection of the foaming agent or foam stabilizer is not strictly limited in the present invention. However, it is desirable to avoid using materials which are considered to markedly impair the fluidity of the resin-containing liquid or the coating operation of the resin-containing liquid. Further, the amount of the foam stabilizer or foaming agent should preferably fall, in terms of the solid content thereof, within a range of between 0 and 30 parts by weight, much preferably between 1 and 20 parts by weight, relative to 100 parts by weight of the resin-containing liquid. When the amount of the foam stabilizer or foaming agent exceeds 30 parts by weight, it is difficult to improve markedly the desired effect.

It is also possible to add an electrically conductive agent to the resin-containing liquid in order to control the surface electrical resistance of the coated layer at a desired value. The electrically conductive agents used in the present invention preferably include sodium chloride, potassium chloride, styrene-maleic acid copolymer, and quaternary ammonium salt, although the electrically conductive agents need not be limited to these materials.

The coating method for forming the coated layer on the surface of a sheet substrate can be selected optionally from among the known methods including, for example, a Mayer bar system, a gravure roll system, a roll system, a reverse roll system, a blade system, a knife system, an air knife system, an extrusion system and a cast system.

The transfer sheet of the present invention comprising the coated layer is prepared by coating the surface of a sheet substrate with a foam-containing liquid, followed by drying the coating. The transfer sheet after the drying step of the coated layer can be used as it is so as to obtain a good picture image recorded thereon. Further, it is desirable to apply a finishing treatment to the coated layer by using a metal roll, a resin roll or a super calender roll using in combination a metal roll and a cotton roll so as to further improve the surface smoothness of the coated layer. It is also possible to bring a transfer sheet after the coating step and under a semi-dried or dried state into contact with, for example, a mirror-finished, warmed or non-warmed cast drum, so as to improve the surface smoothness of the coated layer of the transfer sheet. It should be noted, however, that, if the finishing treatment for improving the surface smoothness is applied under an unduly high pressure, the resin wall surrounding the foams of the coated layer is collapsed so as to increase the density of the coated layer, leading to decrease in the heat insulating properties or cushioning properties of the transfer sheet or leading to the collapse of the foams on the surface of the coated layer. As a result, the coated layer having an excellent toner transfer capability may not be sometimes obtained. Therefore, it is important to pay careful attention to the treating conditions of the finishing treatment.

The sheet substrate used in the present invention includes, for example, paper sheets such as a cellulose-based paper sheet, a coated paper sheet, and a laminated paper sheet; and fabrics such as a woven fabric and a non-woven fabric. It is also possible to use plastic films such as a polyolefin film, a methacrylate film and a cellulose acetate film; synthetic paper sheets comprising polyolefin and a pigment; and porous synthetic resin films such as a foamed polyethylene terephthalate film and a foamed polypropylene film.

In manufacturing the transfer sheet of the present invention by coating the surface of a sheet substrate with a foam-containing resin liquid, the sheet itself may curl with the coating side inside or outside in some cases during the coating, drying and winding steps. In this case, when the resultant sheet is cut into a plurality of sheets of a predetermined size for use as a transfer sheet on which a picture image is to be recorded, troubles are generated, for example, in that the resultant transfer sheet fails to be fed as desired into an image forming apparatus or in that the resultant transfer sheet fails to run smoothly within the image forming apparatus.

For preventing the various troubles caused by curling, it is desirable to diminish as much as possible the difference in the thermal shrinking coefficient or thermal expansion coefficient between the coated layer and the sheet substrate. For this purpose, a curl-preventing layer may be formed by means of coating or lamination on the back surface of the sheet substrate, on which the coated layer is not formed. The materials, forming methods, coating amounts, laminating amounts, etc. of the curl-preventing layer are not limited at all in the present invention. In other words, these conditions can be determined appropriately in view of the kind and thickness of the sheet substrate or the properties of the coated layer such as the composition, foaming magnification, coating amount, etc. of the coated layer.

When the resultant transfer sheet is allowed to run within a picture image forming apparatus, the sheet incurs various frictions deparding on the kind of the sheet substrate, because of the required mechanism of the image forming apparatus. Also, the humidity within the apparatus tends to be lowered by the heating employed within the apparatus. These phenomena cause singly or in combination the transfer sheet to be charged with electrostatic charge. When an image forming operation is carried out continuously to produce a plurality of transfer sheets under these conditions, the front surface of the transfer sheet having the picture image formed thereon is electrostatically bonded to and, thus, is unlikely to be peeled off from the back surface of the subsequent transfer sheet. Particularly, various plastic sheets or synthetic paper sheets are essentially likely to be electrostatically charged. As a result, when these sheets are used as a sheet substrate, the front and back surfaces of the transfer sheets are rendered difficult to be peeled off from each other by the electrostatic charge generation in the cutting step into transfer sheets of a desired size or during storage of the manufactured transfer sheets. Naturally, these troubles may take place even where paper sheets are used as the sheet substrate. For preventing the troubles caused by the electrostatic charging, it is highly effective to form a so-called anti-static layer on the back surface of the transfer sheet. It is also possible to prevent the electrostatic charging by using an anti-static material or by decreasing the friction coefficient between the back surface of the transfer sheet and the coated layer. Consequently, the anti-static layer can be formed by various methods using suitable materials, which are selected appropriately from among various methods and various materials, as in the formation of the curl-preventing layer.

The curl-preventing layer and the anti-static layer can be formed separately on the back surface of the sheet substrate so as to obtain desired performances. Alternatively, however, a single layer performing the functions of both the curl-preventing layer and the anti-static layer can be formed, as desired, for achieving the desired objects such as simplification of the manufacturing process, reduction of the manufacturing cost, and keeping of the desired level of the performance by selecting appropriately the materials and the forming method. In short, it is possible to provide a single layer with the capability of preventing troubles such as the curling and the anti-static charging. As a result, the number of layers formed on the back surface of the sheet substrate is not limited at all in the present invention.

EXAMPLES

The present invention will be further explained in more detail with reference to the following examples. However, the scope of the present invention is not limited at all by the following examples. Incidentally, the expressions "parts" and "%" in the following examples and comparative examples represent "parts by weight of the solid content" and "% by weight", respectively, unless otherwise defined specifically.

Example 1

The resin-containing liquid (solid content of 30%) having the composition given below for 3 minutes was stirred by using a stirrer "Kenmix Aiko PRO" (a trademark of a stirrer manufactured by Aikosha Seisaku-sho K.K.), at a stirring rate of 490 rpm, to carry out the foaming treatment. In this case, the foaming magnification was 1.5 time.

| Composition of Resin-containing Liquid | Parts |
|---|---|
| Aqueous polyurethane resin (trademark of "Adekabon Tighter HUX-401", manufactured by Asahi Denka Kogyo K.K.) | 100 |
| Higher fatty acid amide foam stabilizer (trademark of YC80C, manufactured by Kanebo NSC K.K.) | 5 |
| Carboxymethyl cellulose for controlling the viscosity of the liquid (for thickening the liquid) (trademark of "AG Gum", manufactured by Dai-ichi Kogyo Seiyaku K.K.) | 10 |

Immediately after the foaming treatment, one surface of a high quality paper sheet having a basis weight of 75 g/m$^2$, coated with NaCl and having a surface electrical resistance of $1\times10^{9}\Omega$, was coated with the resultant foam-containing liquid by using an applicator bar in a coating amount of 15 g/m$^2$ (dry weight). Then, the coating was dried so as to obtain a transfer sheet having a porous resin-containing coated layer. The coated layer of the resultant transfer sheet was found to exhibit a surface electrical resistance of $1.7\times10^{10}\Omega$. Also, the density of the coated layer was found to be 0.45 g/cm$^3$.

Example 2

A resin-containing liquid having the same composition as in Example 1 was stirred for 10 minutes using the stirrer used in Example 1 at a stirring rate of 490 rpm so as to obtain a foam-containing liquid having a foaming magnification of 3.0 times. Immediately after the foaming treatment, one surface of a high quality paper sheet having a basis weight of 75 g/m$^2$ was coated with the resultant foam-containing liquid using an applicator bar in a coating amount of 15 g/m$^2$ (dry weight). Then, the coating was dried so as to obtain a transfer sheet having a porous resin-containing coated layer. The coated layer of the resultant transfer sheet was found to exhibit a surface electrical resistance of $1.9\times10^{10}\Omega$. Also, the density of the coated layer was found to be 0.25 g/cm$^3$.

Example 3

A resin-containing liquid having the same composition as in Example 1 was stirred for 25 minutes using the stirrer used in Example 1 at a stirring rate of 490 rpm so as to obtain a foam-containing liquid having a foaming magnification of 5.0 times. Immediately after the foaming treatment, one surface of a high quality paper sheet having a basis weight of 75 g/m$^2$ was coated with the resultant foam-containing liquid using an applicator bar in a coating amount of 15 g/m$^2$ (dry weight). Then, the coating was dried so as to obtain a transfer sheet having a porous resin-containing coated layer. The coated layer of the resultant transfer sheet was found to exhibit a surface electrical resistance of $2.1\times10^{10}\Omega$. Also, the density of the coated layer was found to be 0.18 g/cm$^3$.

Example 4

One surface of a high quality paper sheet having a basis weight of 75 g/m$^2$ was coated with a foam-containing liquid prepared as in Example 2 using an applicator bar in a coating amount of 25 g/m$^2$ (dry weight). Then, the coating was dried so as to obtain a transfer sheet having a porous resin-containing coated layer. The coated layer of the resultant transfer sheet was found to exhibit a surface electrical resistance of $1.8\times10^{10}\Omega$. Also, the density of the coated layer was found to be 0.24 g/cm$^3$.

Example 5

One surface of a high quality paper sheet having a basis weight of 75 g/m$^2$ was coated with a foam-containing liquid prepared as in Example 2 using an applicator bar in a coating amount of 5 g/m$^2$ (dry weight). Then, the coating was dried so as to obtain a transfer sheet having a porous resin-containing coated layer. The coated layer of the resultant transfer sheet was found to exhibit a surface electrical resistance of $1.2\times10^{10}\Omega$. Also, the density of the coated layer was found to be 0.23 g/cm$^3$.

Example 6

One surface of a synthetic paper sheet having a thickness of 110 μm (trademark of "Yupo FPG-110", manufactured by Oji Yuka Synthetic Paper K.K.) was coated with a foam-containing liquid prepared as in Example 2 using an applicator bar in a coating amount of 15 g/m$^2$ (dry weight). Then, the coating was dried so as to obtain a transfer sheet having a porous resin-containing coated layer. The coated layer of the resultant transfer sheet was found to exhibit a surface electrical resistance of $1.5\times10^{10}\Omega$. Also, the density of the coated layer was found to be 0.26 g/cm$^3$.

Example 7

Example 2 was repeated using a resin-containing liquid (solid content of 30%) having the same composition as given below as in Example 2. The foaming magnification was 3.0 times.

| Composition of Resin-containing Liquid | Parts |
|---|---|
| Aqueous polyurethane resin (trademark of "Adekabon Tighter HUX-401", manufactured by Asahi Denka Kogyo K.K.) | 50 |
| SBR latex (trademark of L-1612, manufactured by Asahi Kasei Kogyo K.K.) | 50 |
| Higher fatty acid amide foam stabilizer (trademark of YC80C, manufactured by Kanebo NSC K.K. | 5 |
| Carboxymethyl cellulose for controlling the viscosity of the liquid (for thickening the liquid) (trademark of "AG Gum", manufactured by Dai-ichi Kogyo Seiyaku K.K.) | 10 |

Immediately after the foaming treatment, one surface of a high quality paper sheet having a basis weight of 75 g/m$^2$ was coated with the resultant foam-containing liquid using an applicator bar in a coating amount of 15 g/m$^2$ (dry weight). Then, the coating was dried so as to obtain a transfer sheet having a porous resin-containing coated layer. The coated layer of the resultant transfer sheet was found to exhibit a surface electrical resistance of 1.4×10$^{10}$Ω. Also, the density of the coating layer was found to be 0.24 g/cm$^3$.

Example 8

A foam-containing liquid prepared as in Example 2 was left to stand for 5 minutes after completion of the foaming treatment (foaming magnification: 3.0 times). Then, one surface of a high quality paper sheet having a basis weight of 75 g/m$^2$ was coated with the resultant foam-containing liquid using an applicator bar in a coating amount of 15 g/m$^2$ (dry weight). Further, the coating was dried so as to obtain a transfer sheet having a porous resin-containing coated layer. The coated layer of the resultant transfer sheet was found to exhibit a surface electrical resistance of 1.6×10$^{10}$Ω. Also, the density of the coated layer was found to be 0.22 g/cm$^3$.

Example 9

A foam-containing liquid prepared as in Example 2 was left to stand for 15 minutes after completion of the foaming treatment (foaming magnification: 2.8 times). Then, one surface of a high quality paper sheet having a basis weight of 75 g/m$^2$ was coated with the resultant foam-containing liquid using an applicator bar in a coating amount of 15 g/m$^2$ (dry weight). Further, the resin-containing coated was dried so as to obtain a transfer sheet having a porous coated layer. The coated layer of the resultant transfer sheet was found to exhibit a surface electrical resistance of 1.5×10$^{10}$Ω. Also, the density of the coating layer was found to be 0.28 g/cm$^3$.

Example 10

Example 2 was repeated using a liquid mixture prepared by adding 0.1 part of sodium chloride to a resin-containing liquid having the same composition as used in Example 1. The foaming magnification was 2.9 times. Immediately after the foaming treatment, one surface of a high quality paper sheet having a basis weight of 75 g/m$^2$ was coated with the resultant foam-containing liquid using an applicator bar in a coating amount of 15 g/m$^2$ (dry weight). Then, the coating was dried so as to obtain a transfer sheet having a porous resin-containing coated layer. The coated layer of the resultant transfer sheet was found to exhibit a surface electrical resistance of 2.0×10$^9$Ω. Also, the density of the coated layer was found to be 0.27 g/cm$^3$.

Example 11

One surface of a high quality paper sheet having a basis weight of 90 g/m$^2$, coated with NaCl and having a surface electrical resistance of 7×10$^{10}$Ω, was coated with a foam-containing liquid prepared as in Example 2 using an applicator bar in a coating amount of 15 g/m$^2$ (dry weight). Then, the coating was dried so as to obtain a transfer sheet having a porous resin-containing coated layer. The coating layer of the resultant transfer sheet was found to exhibit a surface electrical resistance of 4.2×10$^{11}$Ω. Also, the density of the coated layer was found to be 0.26 g/cm$^3$.

Example 12

One surface (front surface) of a high quality paper sheet having a basis weight of 75 g/m$^2$ was coated with a foam-containing liquid prepared as in Example 2 using an applicator bar in a coating amount of 15 g/m$^2$ (dry weight). The coating was dried to form a porous resin-containing coated layer. The back surface of the resultant high quality paper sheet was similarly coated with the same foam-containing liquid in a coating amount (dry weight) of 15 g/m$^2$. Then, the coating on the back surface was dried so as to obtain a transfer sheet having a porous resin-containing coated layer on each of the front and back surfaces thereof. The coated layer on the front surface of the resultant transfer sheet was found to exhibit a surface electrical resistance of 2.5×10$^{10}$Ω. Also, the density of the coated layer was found to be 0.24 g/cm$^3$. On the other hand, the coating layer on the back surface of the resultant transfer sheet was found to exhibit a surface electrical resistance of 2.8×10$^{10}$Ω. Also, the density of the coating layer was found to be 0.26 g/cm$^3$.

Comparative Example 1

One surface of a high quality paper sheet having a basis weight of 75 g/m$^2$ was coated with a resin-containing liquid having the same composition as used in Example 1, to which a foaming treatment was not applied, by using an applicator bar in a coating amount of 15 g/m$^2$ (dry weight). Then, the coating was dried so as to obtain a transfer sheet having a coated layer formed on the surface thereof. The coating layer was found to exhibit a surface electrical resistance of 1.2×10$^{10}$Ω. Also, the density of the coating layer was found to be 1.1 g/cm$^3$.

Comparative Example 2

A foam-containing liquid prepared as in Example 2 was left to stand for 30 minutes after completion of the foaming treatment (forming magnification: 3.0 times). Then, one surface of a high quality paper sheet having a basis weight of 75 g/m$^2$ was coated with the resultant foam-containing liquid using an applicator bar in a coating amount of 15 g/m$^2$ (dry weight). Further, the coating was dried so as to obtain a transfer sheet having a porous coated layer. The coated layer of the resultant transfer sheet was found to exhibit a surface electrical resistance of 1.8×10$^{10}$Ω. Also, the density of the coated layer was found to be 0.31 g/cm$^3$.

Comparative Example 3

An electrophotographic transfer sheet available on the market, i.e., a Xerox paper sheet J, was used as it is as a transfer sheet. The surface electrical resistance on the recording surface of the transfer sheet was found to be 3.0×10$^9$Ω.

Measurement and Evaluation Method

[Foaming Magnification]

The foaming magnification is calculated by dividing the weight of 100 ml of the resin-containing liquid (original liquid) before the foaming treatment, by the weight of 100 ml of the foam-containing liquid after the foaming treatment.

[Density and Gloss Contrast of the Recorded Picture Image]

A copying operation was carried out for each of the transfer sheets prepared in Examples 1 to 11 and Comparative Examples 1 to 3 described above using "A color 635" (a trademark for a dry indirect electrophotographic digital color copying machine manufactured by Fuji Xerox Inc).

The copying operation was performed using Test Chart No. 5-1 of Electrophotographic Institute. The reflecting density of the black solid printing portion (Test Chart: +1.8, which corresponds to the highest reflecting density) of each of the resultant copied samples was measured by RD-920 (a trademark for a Macbeth reflection type densitometer manufactured by Macbeth Inc).

Gloss was measured by a digital variable angle gloss meter (manufactured by Nippon Denshoku K.K.). The gloss contrast was determined by a difference in gloss between the 60° C. gloss at the black solid printed portion (Test Chart: +1.8) and the 60° C. at the blank portion for each of the copied samples. It should be noted that the smaller the value of the gloss contrast, the better for the practical use of the transfer sheet.

[Picture Image Quality]

The picture image quality in the region ranging from the half tone portion to the high density picture image portion of the solid copied portion for each of the copied samples was visually evaluated based on the following standard:

◎: Substantially free from disturbances in the mottles and dots, leaving no practical problem at all.

○: Disturbances in the mottles and dots were slightly recognized. But, there was no problem in practice.

Δ: Disturbances in the mottles and dots were recognized considerably, leaving some practical problems.

X: Conspicuous disturbances in the mottles and dots, giving rise to severe problems in practice.

the area defined by the contour of the pore obtained by a picture image analyzing apparatus was converted into the corresponding area of a true circle, and the diameter of the corresponding true circle was determined as the diameter of the pore. The surface pore opening area ratio was calculated by the formula given below:

$$\text{Surface Pore Opening Area Ratio } (\%) A/B \times 100,$$

where A is the total area of the open portions occupied by the pores, and B is the total surface area of the coated layer.

[Measurement of Surface Electrical Resistance]

The surface electrical resistance of the transfer sheet was measured using R8340 (a trademark for Ultra High Resistance Meter manufactured by Advantest Inc.), under an environment of 20° C. and a relative humidity (RH) of 65%.

[Measurement of Coating layer Density]

The density of the coated layer was calculated by the formula given below:

$$\text{Coated Layer Density } (g/cm^2) = C/D,$$

where C=(basis weight (g/m$^2$) of the coated paper sheet)−(basis weight (g/m$^2$) of the original paper sheet; and D=thickness of the coated paper sheet (μm)−thickness of the original paper sheet (μm).

The experimental data are given in Table 1 below:

TABLE 1

| | Foaming Magnification | Coating Amount (g/m$^2$) | Surface Average Pore Diameter (μm) | Surface Pore Opening Area Ratio (%) | Coated Layer Density (g/cm$^3$) | Surface Electrical Resistance (Ω) | Highest Reflection Density | Gloss Contrast | Image Quality |
|---|---|---|---|---|---|---|---|---|---|
| Example 1 | 1.5 | 15 | 8.2 | 25 | 0.45 | $1.7 \times 10^{10}$ | 1.65 | 4.6 | ○ |
| Example 2 | 3.0 | 15 | 6.5 | 41 | 0.25 | $1.9 \times 10^{10}$ | 1.62 | 4.1 | ◎ |
| Example 3 | 5.0 | 15 | 5.4 | 51 | 0.18 | $2.1 \times 10^{10}$ | 1.63 | 3.8 | ◎ |
| Example 4 | 3.0 | 25 | 6.9 | 42 | 0.24 | $1.8 \times 10^{10}$ | 1.63 | 4.0 | ◎ |
| Example 5 | 3.0 | 5 | 5.2 | 42 | 0.23 | $1.2 \times 10^{10}$ | 1.61 | 3.7 | ○ |
| Example 6 | 3.0 | 15 | 6.8 | 45 | 0.26 | $1.5 \times 10^{10}$ | 1.64 | 4.4 | ◎ |
| Example 7 | 3.0 | 15 | 6.7 | 45 | 0.24 | $1.4 \times 10^{10}$ | 1.66 | 4.5 | ○ |
| Example 8 | 3.0 | 15 | 21.0 | 39 | 0.22 | $1.6 \times 10^{10}$ | 1.58 | 4.3 | ○ |
| Example 9 | 2.8 | 15 | 43.0 | 37 | 0.28 | $1.5 \times 10^{10}$ | 1.56 | 4.3 | ○ |
| Example 10 | 2.9 | 15 | 6.1 | 42 | 0.27 | $2.0 \times 10^{9}$ | 1.63 | 4.8 | ◎ |
| Example 11 | 3.0 | 15 | 6.4 | 46 | 0.26 | $4.2 \times 10^{11}$ | 1.60 | 5.2 | ○ |
| Example 12 | front 3.0 | 15 | 6.8 | 39 | 0.24 | $2.5 \times 10^{10}$ | 1.56 | 5.1 | ○ |
| | back 3.0 | 15 | 6.9 | 38 | 0.26 | $2.8 \times 10^{10}$ | 1.60 | 4.6 | ○ |
| Comp. Ex. 1 | non-foamed | 15 | — | — | 1.1 | $1.2 \times 10^{10}$ | 1.38 | 10.5 | x |
| Comp. Ex. 2 | 3.0 | 15 | 56.0 | 34 | 0.31 | $1.8 \times 10^{10}$ | 1.36 | 4.0 | Δ |
| Comp. Ex. 3 | — | — | — | — | — | $3.0 \times 10^{9}$ | 1.68 | 11.7 | ○ |

[Method of Measuring Surface Pore Diameter and Surface Pore Opening Area Ratio]

For measuring the surface pore diameter and the pore opening area ratio of the resin-containing coated layer, the surface of the coated layer was photographed using a scanning electron microscope or an optical microscope. Then, the contours of the pores on the surface of the coated layer were accurately depicted on a transparent film by using, for example, a black pen, followed by measuring the pore diameters and the pore opening area ratio by using Luzex III (trademark for a drum scanner manufactured by Nireco Inc.). Incidentally, the pores appearing on the surface of the coated layer were not necessarily circular. Therefore, As apparent from Table 1, the transfer sheets of the examples are high in recorded picture image density, low in its gloss contrast, and free from disturbances of the mottles and dots. Accordingly, they provide an excellent picture image quality. In Comparative Example 1 wherein the resin-containing liquid having the same composition as in Example 1 is used, but the resin-containing liquid is not foamed, the coated layer was not porous, and accordingly, the density of the recorded picture image is insufficient, the gloss contrast is large, mottles are prominent in the picture image portion, and the recorded picture image was unnatural and low in clarity. In Comparative Example 2 wherein the surface average diameter of the pores of the coated layer is 56 μm, the density of the recorded picture image is insufficient, mottles are prominent in the picture image portion, and the clarity of the recorded picture image is low. In case of the Zerox transfer sheet available on the market (Comparative Example 3), the gloss contrast was markedly high, and the recorded picture image was natural, making the transfer sheet unsatisfactory in practical use.

As described above in detail, the present invention provides a transfer sheet used for recording of a picture image in electrophotography. When the transfer sheet of the present invention is used for a full color or monochromatic recording in indirect electrophotographic system, the recorded picture image portion is free from disturbances of mottles and dots. In addition, the gloss contrast between the blank portion and the recorded picture image portion is low, making it possible to obtain a picture image of a high quality. Therefore, the present invention is of a high practical value.

What is claimed is:

1. A transfer sheet for electrophotography comprising a sheet substrate and a porous resin-containing coated layer formed on at least one surface of said substrate, said coated layer having a surface average pore diameter of 0.5 to 50 μm, having a surface pore opening area ratio of 10 to 70%, and having a density of 0.1 to 0.8 $g/cm^3$.

2. The transfer sheet of claim 1, wherein said coated layer has a surface average pore diameter of 1 to 20 μm.

3. The transfer sheet of claim 1, wherein said coated layer has a surface pore opening area ratio of 15 to 50%.

4. The transfer sheet of claim 1, wherein said coated layer has a density of 0.2 to 0.7 $g/cm^3$.

5. The transfer sheet of claim 1, wherein said coated layer has a surface electrical resistance of $1.0\times10^8\Omega$ to $1.0\times10^{12}\Omega$ at 20° C. and under a relative humidity (RH) of 65%.

6. The transfer sheet of claim 5, wherein said coated layer has a surface electrical resistance of $1.0\times10^8\Omega$ to $1.0\times10^{11}\Omega$ at 20° C. and under a relative humidity (RH) of 65%.

7. The transfer sheet of claim 1, wherein said pores of said coated layer are continuous.

8. The transfer sheet of claim 1, wherein said coated layer is formed by coating on said substrate a resin-containing liquid which has been previously mechanically stirred so that said resin-containing liquid contains foams dispersed therein.

9. The transfer sheet of claim 8, wherein the foaming magnification of the resin-containing liquid (F) is $1<F\leqq5$.

10. A process for preparing a transfer sheet for electrophotography comprising a sheet substrate and a porous resin-containing coated layer formed on at least one surface of said substrate, wherein said coated layer has a surface average pore diameter of 0.5 to 50 μm, a surface pore opening area ratio of 10 to 70%, and a density of 0.1 to 0.8 $g/cm^3$, said process comprising:

1) preparing a resin-containing liquid containing foams dispersed therein;

2) coating the resultant liquid on a sheet substrate; and 3) drying the resulting coating.

11. The process of claim 10, wherein said coated layer has a surface average pore diameter of 1 to 20 μm.

12. The process of claim 10, wherein said coated layer has a surface pore opening area ratio of 15 to 50%.

13. The process of claim 10, wherein said coated layer has a density of 0.2 to 0.7 $g/cm^3$.

14. The process of claim 10, wherein said coated layer has a surface electrical resistance of $1.0\times10^8\Omega$ to $1.0\times10^{12}\Omega$ at 20° C. and under a relative humidity (RH) of 65%.

15. The process of claim 14, wherein said coated layer has a surface electrical resistance of $1.0\times10^8\Omega$ to $1.0\times10^{11}\Omega$ at 20° C. and under a relative humidity (RH) of 65%.

16. The process of claim 10, wherein said pores of said coated layer are continuous.

17. The process of claim 10, wherein the foaming magnification of the resin-containing liquid (F) is $1<F\leqq5$.

* * * * *